(12) United States Patent
Lin et al.

(10) Patent No.: US 10,956,499 B2
(45) Date of Patent: Mar. 23, 2021

(54) EFFICIENT PROPERTY GRAPH STORAGE FOR STREAMING/MULTI-VERSIONING GRAPHS

(71) Applicant: International Business Machines Corporation, Armonk, NY (US)

(72) Inventors: Ching-Yung Lin, Scarsdale, NY (US); Yanbin Liu, New Haven, CT (US); Lifeng Nai, Atlanta, GA (US); Wei Tan, Elmsford, NY (US); Ilie G. Tanase, Somers, NY (US); Yinglong Xia, Rye Brook, NY (US)

(73) Assignee: International Business Machines Corporation, Armonk, NY (US)

( * ) Notice: Subject to any disclaimer, the term of this patent is extended or adjusted under 35 U.S.C. 154(b) by 266 days.

(21) Appl. No.: 15/264,570

(22) Filed: Sep. 13, 2016

(65) Prior Publication Data

US 2018/0075159 A1   Mar. 15, 2018

(51) Int. Cl.
*G06F 16/28* (2019.01)
*G06F 16/901* (2019.01)

(52) U.S. Cl.
CPC .......... *G06F 16/9024* (2019.01); *G06F 16/28* (2019.01)

(58) Field of Classification Search
CPC ......... G06F 17/30958; G06F 17/30516; G06F 17/30548; G06F 17/30551;
(Continued)

(56) References Cited

U.S. PATENT DOCUMENTS

| 8,768,929 | B2 | 7/2014 | Eldawy | |
| 2013/0339357 | A1* | 12/2013 | Eldawy | G06F 16/9027 707/737 |

(Continued)

OTHER PUBLICATIONS

Anonymous, Imposing Transactionality in Lossy Stream Processing Graphs, IP.com Disclosure No. IPCOM000233751D, Dec. 18, 2013, pp. 1-5.
(Continued)

*Primary Examiner* — Ashish Thomas
*Assistant Examiner* — Suman Rajaputra
(74) *Attorney, Agent, or Firm* — Daniel Morris; Otterstedt, Wallace & Kammer, LLP

(57) ABSTRACT

A data storage and retrieval system for a computer memory includes a stream graph engine extracting graph data from streaming data, the graph data occupying a sliding window and comprising a plurality of slices representing a set of contiguous graphs, and where each slice of the plurality of slices corresponds to a given graph structure and its properties at a particular time, the stream graph engine causing the computer memory to store an on-disk portion of the graph data including a key table, a timestamp table and a plurality of property files, wherein the key table comprises a plurality of pointers to corresponding entries of the timestamp table, wherein each of the entries of the timestamp table comprise a corresponding timestamp and a pointer to the properties files, wherein the properties files comprise properties of a corresponding graph of the set of contiguous graphs, an in-memory portion of the graph data having a cache data structure storing a subset of the key table, and a versioning control module storing evolving changes in the graph data in the computer memory.

15 Claims, 7 Drawing Sheets

(58) Field of Classification Search
CPC ......... G06F 17/30952; G06F 17/30864; G06F 17/30321; G06F 17/30613; G06F 17/30961; G06F 17/30067; G06F 16/9024; G06F 16/28

See application file for complete search history.

(56) References Cited

U.S. PATENT DOCUMENTS

| | | | |
|---|---|---|---|
| 2014/0059185 A1* | 2/2014 | Siripurapu | G06F 16/951 709/219 |
| 2014/0279855 A1* | 9/2014 | Tan | G06F 16/273 707/609 |
| 2014/0380291 A1 | 12/2014 | Auerbach | |
| 2015/0067088 A1* | 3/2015 | Guerin | G06F 16/9014 709/213 |
| 2015/0156238 A1 | 6/2015 | Cooper | |
| 2016/0019228 A1* | 1/2016 | Hong | G06F 16/9024 707/624 |
| 2018/0011892 A1* | 1/2018 | Kimura | G06F 16/2228 |

OTHER PUBLICATIONS

Anonymous, Method and System for Performing Guided Sampling of Linked Data, IP.com Disclosure No. IPCOM000236136D, Apr. 8, 2014, pp. 1-4.

Anonymous, Distribution of Correlated Streams of Data in a Massively Parallel Dataflow Graph, IP.com Disclosure No. IPCOM000239625D, Nov. 20, 2014, pp. 1-4.

* cited by examiner

EFFICIENT PROPERTY GRAPH STORAGE FOR STREAMING/MULTI-VERSIONING GRAPHS

BACKGROUND

The present disclosure relates to storing streaming graphs in memory and/or on disk.

Large scale graph analytics and storage systems have been drawing increasing attention in both academia and industry. Researchers have found high impact applications in a wide variety of big data domains, ranging from social media analysis, recommendation systems, and insider threat detection, to medical diagnosis and protein interactions. These applications typically handle a vast collection of entities with various relationships, which are represented by graphs. Due to irregular data access patterns in the graph computations, it remains a challenge to deliver efficient solutions for large scale graph analytics. Such inefficiency restricts the utilization of many graph algorithms in big data scenarios.

BRIEF SUMMARY

According to an exemplary embodiment of the present invention, a data storage and retrieval system for a computer memory includes a stream graph engine extracting graph data from streaming data, the graph data occupying a sliding window and comprising a plurality of slices representing a set of contiguous graphs, and where each slice of the plurality of slices corresponds to a given graph structure and its properties at a particular time, the stream graph engine causing the computer memory to store an on-disk portion of the graph data including a key table, a timestamp table and a plurality of property files, wherein the key table comprises a plurality of pointers to corresponding entries of the timestamp table, wherein each of the entries of the timestamp table comprise a corresponding timestamp and a pointer to the properties files, wherein the properties files comprise properties of a corresponding graph of the set of contiguous graphs, an in-memory portion of the graph data having a cache data structure storing a subset of the key table, and a versioning control module storing evolving changes in the graph data in the computer memory.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments may provide one or more of the following advantages:

efficient graph data organization for graph ingestion, query and traversal,
preserved graph topologic data locality, and
efficient graph traversals.

These and other features and advantages of the present invention will become apparent from the following detailed description of illustrative embodiments thereof, which is to be read in connection with the accompanying drawings.

BRIEF DESCRIPTION OF THE SEVERAL VIEWS OF THE DRAWINGS

Preferred embodiments of the present invention will be described below in more detail, with reference to the accompanying drawings.

DETAILED DESCRIPTION

Figure 1:
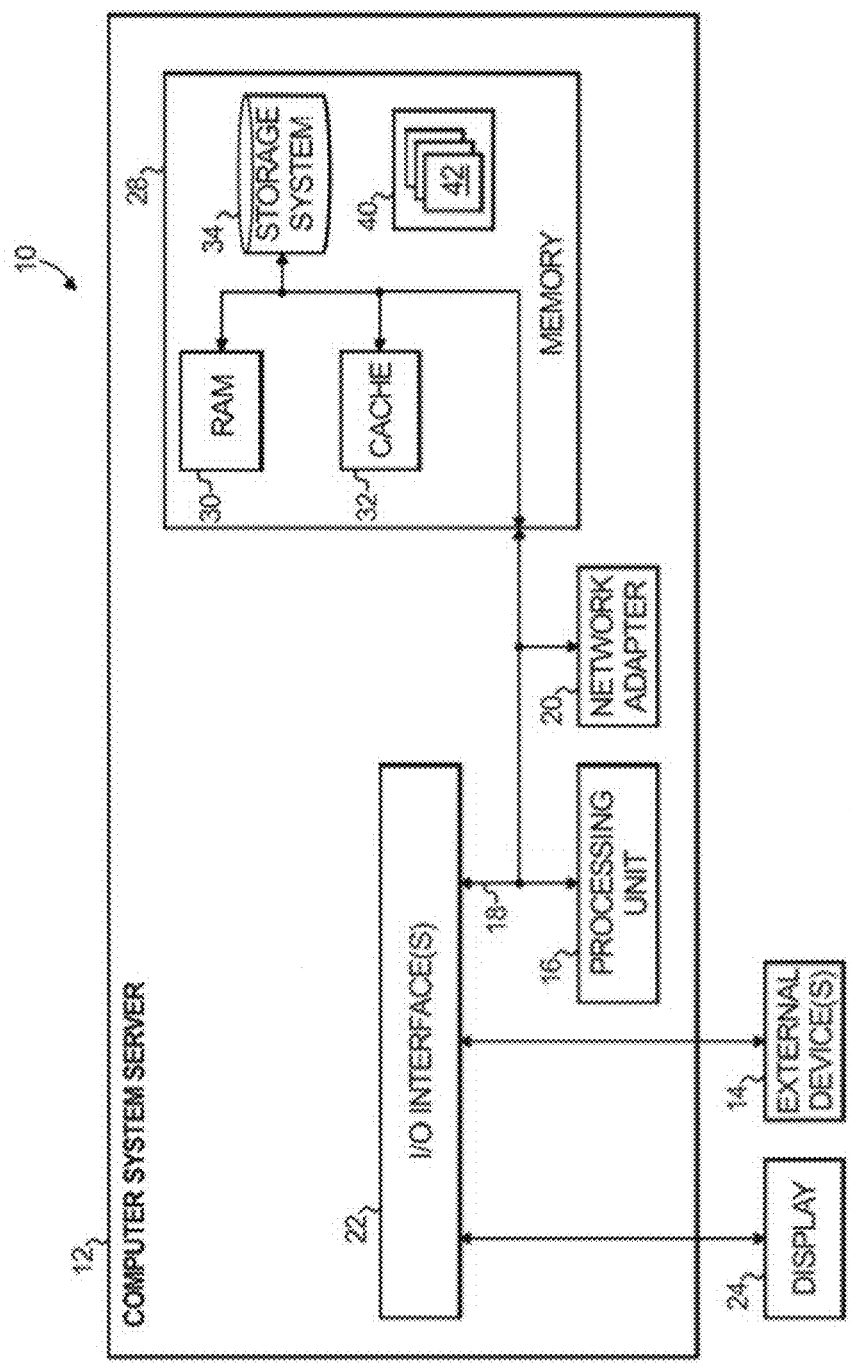
FIG. 1 depicts a cloud computing node according to an embodiment of the present invention.

For purposes of the following description, the characteristics of typical big data analytics should be understood. These include graph structures with massive collections of inter-related entities (e.g., social networks), rich properties with advanced models and semantic descriptions resulting in heavy vertex/edge properties of various types, dynamics with both graph structure and properties changing with time and time series information, persistency requirement for data larger than memory, and data access efficiency for retrieving large amounts of data in short time periods.

According to an exemplary embodiment of the present invention, to address performance issues in large scale graph analytics, a graph storage system exploits efficient graph data organization for graph query and traversal. The graph storage system is based on an understanding of generic analytic algorithms on graphs and platform architectural utilization for graph computing. The graph storage system preserves graph topologic data locality and is more amenable for graph traversals. Moreover, the graph storage system supports graph analytics.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Figure 2:
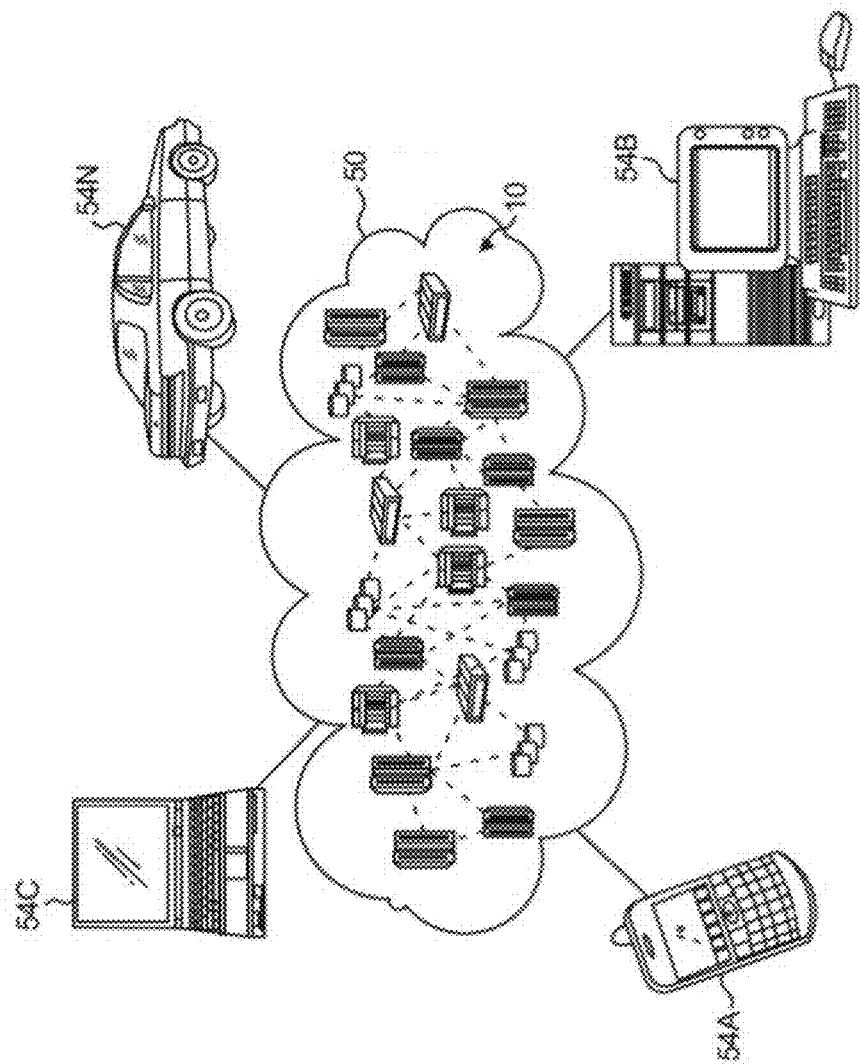
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
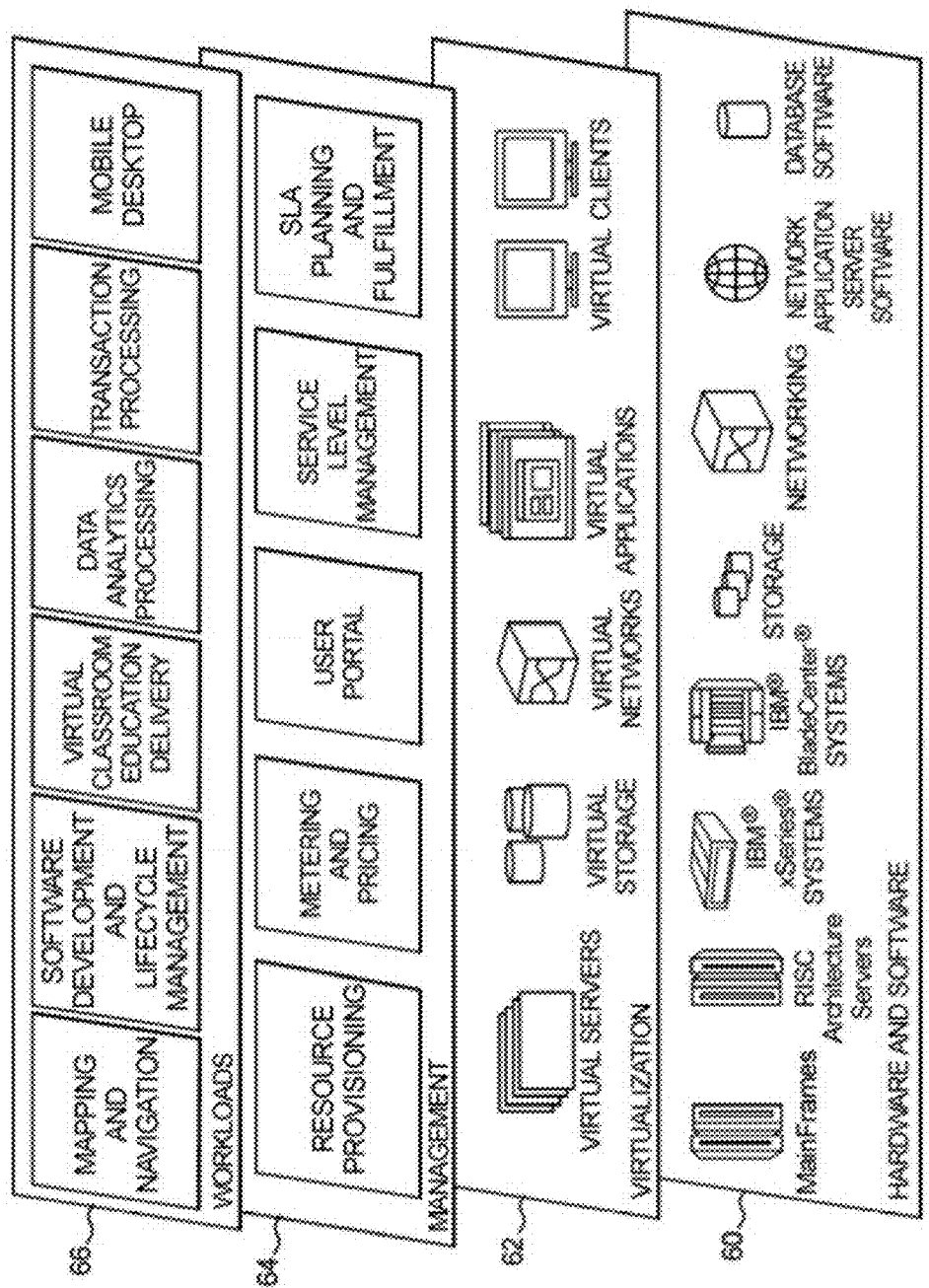
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, Web Sphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

According to an exemplary embodiment of the present invention, a graph storage system is configured to store streaming graphs or multi-version graphs in memory and/or on disk. It should be understood that exemplary techniques described herein with reference to streaming graphs, streaming graph data and timestamps also apply to multi-version graphs, multi-version data and versions thereof. Embodiments of the present invention enable tracing of graph structural/property dynamics at particular timestamps or versions, improved cache performance through data locality, and efficient traversal and property access for graphs. Embodiments of the present invention achieve excellent Level 1 Data Memory data locality and are amenable to active storage, such as sold-state drives (SSD) or flash drives.

According to an exemplary embodiment of the present invention, the graph storage system organizes property graph data in a vertex-centric manner with multi-versioning nodes/edges, which is suitable for representing a streaming graph within a sliding window, or a graph with transactions According to an exemplary embodiment of the present invention, the graph storage system efficiently handles dynamics in both graph structures and vertex/edge properties, due to the scan-free graph data retrieval and the separation of graph structure and property data.

According to an exemplary embodiment of the present invention, the graph storage system caches graph data in memory in either batch mode or on-demand mode from the streaming data, with a user-defined memory footprint size, which explores the tradeoff between storage latency and bandwidth.

According to an exemplary embodiment of the present invention, the graph storage system accepts graph updates and modifications with or without timestamps, based on copy-on-write, leading to minimal data duplication.

According to an exemplary embodiment of the present invention, graph data organization is efficient for querying graph data regarding a single vertex or edge, and also leads to high performance graph traversals, since the graph topological locality is preserved by the compact storage of adjacent edge lists.

Challenges:

According to an exemplary embodiment of the present invention, one or more of in-memory and on-disk key-value data structure, versioned vertices, edges and properties, and a log for failure recovery are implemented to handle graphs with time evolving structures and properties.

According to an exemplary embodiment of the present invention, graphs can be efficiently traversed by proactively loading (into memory) portions of the graph to be traversed, implementing pointer-chasing on disk, and stitching elements in memory.

According to an exemplary embodiment of the present invention, memory limitations in a single machine can be ameliorated using a storage hierarchy with recent data in memory, storing vertices and their associated data (e.g., edges and properties) to disk when the memory is full or nearly full. Additional techniques include loading a vertex and its vicinity into memory on-demand, and dynamic window re-sizing to control the in-memory content.

According to an exemplary embodiment of the present invention, limited I/O (input/output) bandwidth, particularly for random access, can be handled using pointer-chasing style (instead of index-consulting on disk).

Figure 4:
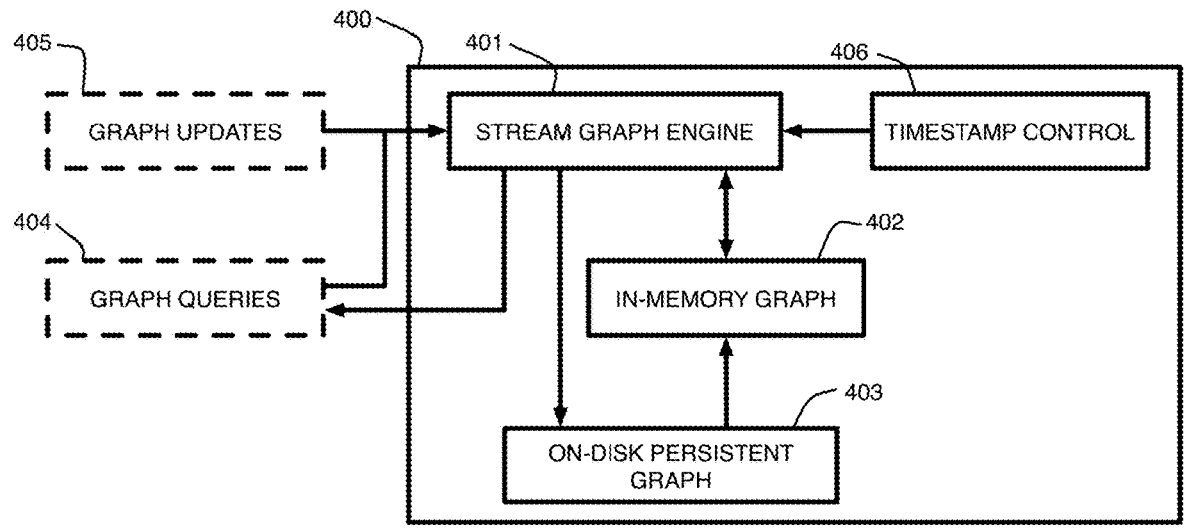
FIG. 4 is a system configured to store streaming graphs, according to an embodiment of the present invention.

According to an embodiment of the present invention and referring to FIG. 4, a computer system 400 includes a stream graph engine 401, memory device 402 (e.g., random access memory (RAM), etc.) and persistent storage 403 (e.g., hard disk, main memory). According to an embodiment of the present invention, the computer system 400 maintains two different data representations, including one in memory 402 and one on disk 403. These are different storage mediums, and data is copied between them during the management of a graph database.

The stream graph engine 401 executes an algorithm for representing streaming graphs in memory and on persistent storage. The algorithm generates an on-disk graph stored in persistent storage 402 and an in-memory graph stored in memory 403, which are stored in separate, but related, data structures. These data structures both address graph data locality.

The stream graph engine 401 executing the algorithm performs writes by updating the graph structures and properties of both the on-disk graph and the in-memory graph. Graph updates 404 to the in-memory graph are moved to the on-disk graph. Evolving changes are maintained by temporal versioning and timestamps. More particularly, one or more histories (e.g., stored in computer readable files) are maintained, which record updates to the property values (it time), changes in the adjacency of a vertex and/or additions and deletions of the edges (in time). The computer system operates in batch mode using both write-through (synchronous writes both to the memory and disk) and write-back (initial writes to memory, with writes to disk delayed until the memory blocks containing the data are to be modified or replaced by new data) policies. The stream graph engine 401 executing the algorithm performs reads by optimized graph queries 405 and loading. Reads are performed by proactively loading graph structure and property data into memory, on-demand or in batch mode.

According to an embodiment of the present invention, when writing data into the graph database (e.g., adding vertices, setting edges or updating properties), both representations are updated. In at least one exemplary embodiment of the present invention, the memory representation is updated before the disk representation using, for example, write-trough or immediate disk update methods, a write-back method, or a delayed update. According to an embodiment of the present invention, write-trough is used during a typical data modifying operation, and write-back is used in a batch mode, where multiple updates to the graph database are persisted to disk together.

In one or more embodiments of the present invention, a history of updates to the graph database is maintained (e.g., stored on disk), which includes previous updates to a list of edges of a vertex and/or updating properties for vertices and edges. In this way, data is stored to a new copy of the graph database, while maintaining a link to a previous version.

According to an embodiment of the present invention, the stream graph engine 401 is configurable to operate on systems with constrained memory. In a case where the volume of the data on disk is greater than the available physical memory, data in memory is loaded and unloaded from disk on demand.

Figure 5:
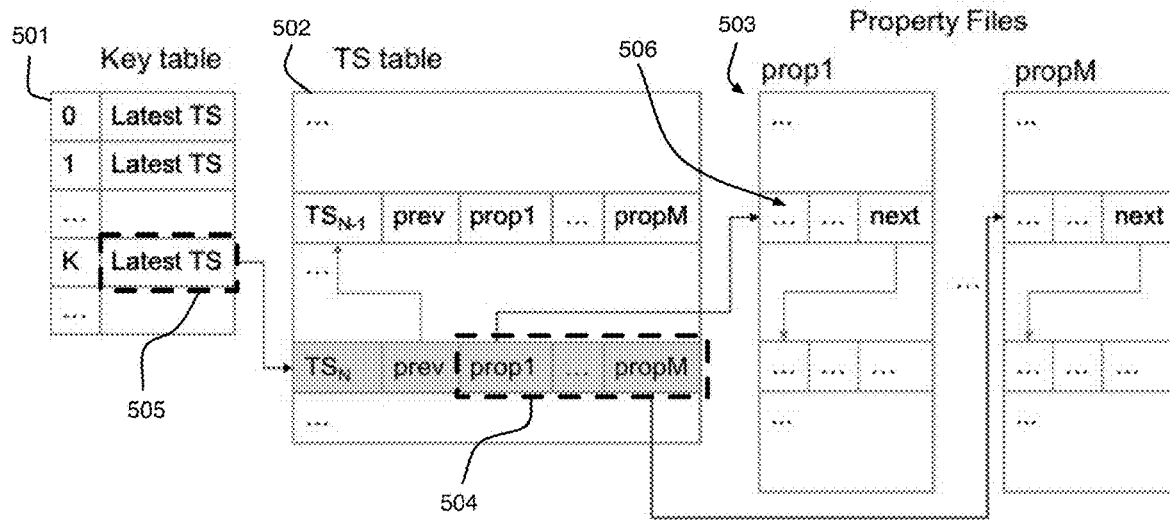
FIG. 5 is an illustration of a persistent storage device storing a streaming graph, according to an embodiment of the present invention.

Referring to FIG. 5, a method is described for organizing data on disk, with data efficient access is provided for accessing data of a particular vertex or edge. The streaming graph is organized in graph data that stores both the streaming graph structure and the vertex and edge properties on disk in persistent storage. For a vertex, access is provided to its adjacency and its properties. For an edge, access is provided to its properties. The data is organized in a number of tables as shown in FIG. 5. In one or more embodiments of the present invention, a custom in memory cache data structure stores the latest set of property pointers 504 as entries (e.g., 505) in a key table (see FIG. 5) to reduce disk access. In at least one embodiment, the entries 505 in the key table 501 are cached in memory when there is sufficient memory. The graph data includes a key table 501, timestamp (TS) table 502 and property table 503.

Referring to FIG. 5, the key table 501, which is stored in persistent memory (i.e., on-disk), includes a vertex (i.e., edge) identifier and a pointer to a latest version (i.e., a most recent timestamp ($TS_N$)) of the vertex in the TS table. The latest $TS_N$ and the corresponding property pointers are stored in cache data structure.

Entries in the TS table 502 includes timestamps (e.g., $TS_N$), pointers (prev) to a previous timestamp (e.g., $TS_{N-1}$), and index (IDX) entries for corresponding adjacent edge lists, and/or properties (e.g., prop1, . . . , propM).

Entries in the property table 503 include the adjacent edge lists and/or properties in chained block structure.

In the context of vertices, table 501 maintains a direct mapping from a vertex unique identifier to a pointer into the TS table 502 corresponding to the last version of that vertex. The entry for the vertex in the TS table 502 maintains a $TS_N$ corresponding to the last modification of this vertex, a pointer (prev) to a previous entry for this vertex in the same TS table 502 and one or more pointers 504 to all the properties of the vertex. These pointers point to other tables (i.e., prop1, . . . , propM), one table for each property of the vertex. For example, if it is decided to store for each vertex of type AUTOMOBILE a property called AGE and a property called VEHICLE-IDENTIFICATION-NUMBER, there will be two tables one for AGE and one for VEHICLE-IDENTIFICATION-NUMBER. The adjacency of a vertex (i.e., edges connected to this vertex) is also maintained as a special property in at least one of the property tables (e.g., 503).

Each individual property table comprises entries of fixed size (506). If a particular property exceeds the fixed size, additional entries are chained using the next pointer.

If a property of a vertex is updated, including its adjacency, a new TS entry is created in the TS table 502. The key table entry in table 501 is updated to point to this new TS entry, the prev pointer of this new TS entry is initialized to point to the previous TS entry for this vertex. The updated property for this vertex creates a new entry into a corresponding Property table (PTENTRY) and the property links in the TS entry are initialized to point to all old properties, except the modified property, which will point to the newly created entry (PTENTRY).

Figure 6:
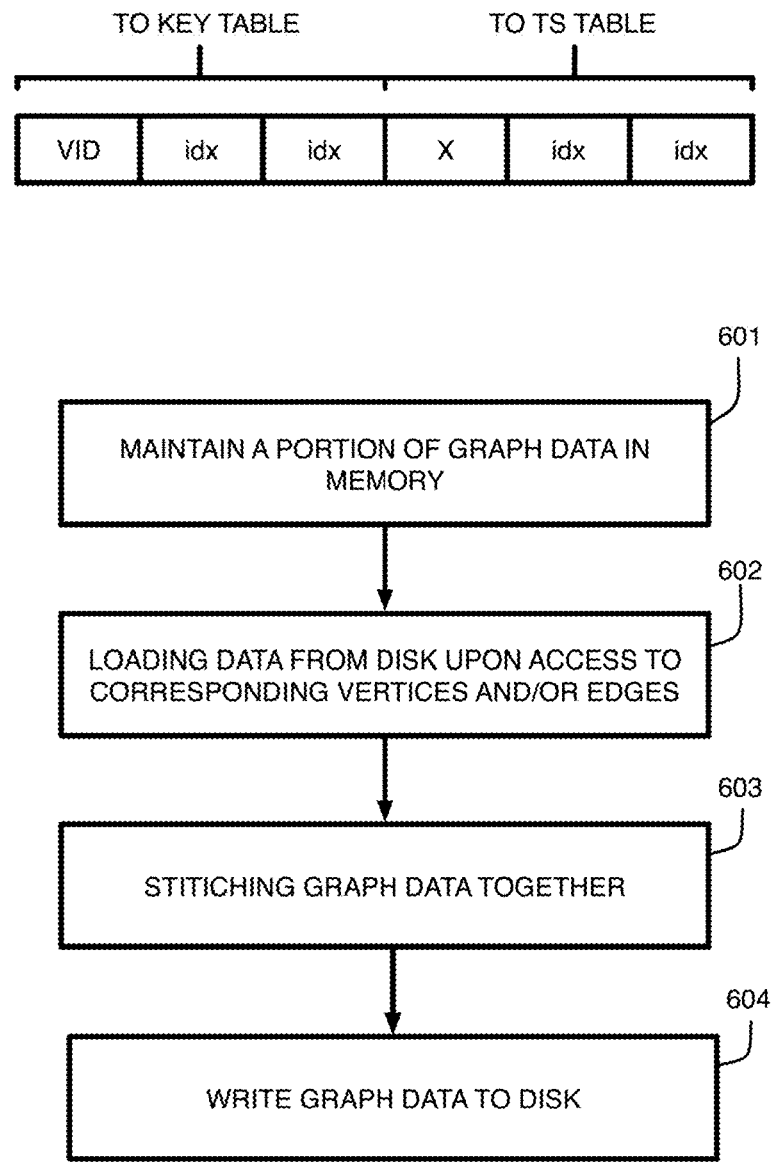
FIG. 6 is a flow diagram for storing graph data in memory either in batch-mode or on-demand from the on-disk streaming graph data according to an embodiment of the present invention.

According to an embodiment of the present invention, graph data is stored in memory either in batch-mode or on-demand from, for example, the on-disk streaming graph data, streaming graph data received from a network, etc. Referring to FIG. 6, the memory maintains a portion of the graph data in memory (e.g., a key table) for efficient data retrieval 601, uses on-demand loading for loading data from disk when the vertices and/or edges are accessed when ingesting new streaming graph data from another disk or from a network 602, and stitches the new graph data together with the existing graph data to increase data locality 603, for example, by appending the new graph data. The updated graph data is then written back to disk 604. The memory, so operating, behaves as an in-memory database, for example, by keeping disk offsets for write-through.

According to an embodiment of the present invention, when accepting graph updates and modifying the graph structure and/or property data accordingly to timestamps, the computer system 400 adds a vertex by appending an element in key table 501 and an element in TS table 502. In a case where the adjacent edge lists of the vertex and other properties, the computer system appends elements in multiple property files. Further, the computer system 400 adds an edge by checking if the two end vertices exist, and if not, adding two end vertices; otherwise adding an edge performs the same operations as shown for vertex addition: Entry is added in 501, 502 and 503 tables. Further, the computer system 400 removes a vertex by removing all elements in all lists regarding the provided vertex identification (VID). The computer system 400 updates a vertex/edge property by adding a new element in TS table 502 that points to the previous element in the list with respect to the same VID/EID (edge ID) and updates the corresponding element in key table 501.

In a case where the computer system 400 adds a vertex or an edge, the indices in the element in TS table are copied from those in a previous timestamp, unless the properties of the vertex or edge is provided, and the counter (e.g., 506) of corresponding entries are increased.

In a case where the computer system 400 removes a vertex or an edge, a counter in corresponding property files (e.g., prop1, 503) are decreased and entries are removed when the counter becomes zero.

Figure 7:
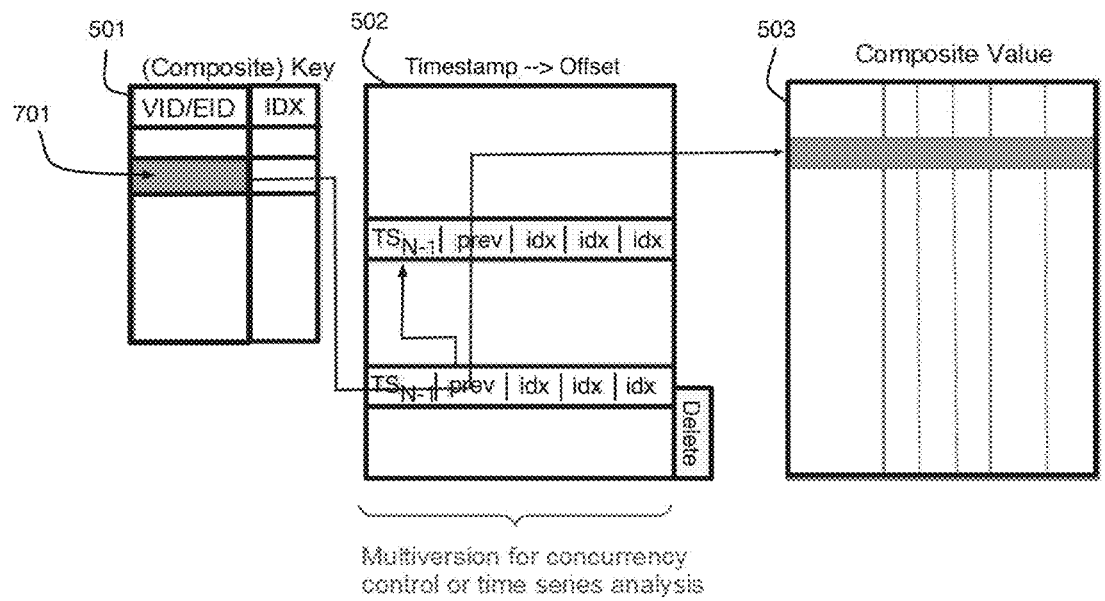
FIG. 7 is an illustration of a property bundle according to an embodiment of the present invention.

Referring to FIG. 7, the properties of a vertex or an edge can be stored in a set of property files 503, each called a property bundle 701. Each property bundle 701 includes of one or more properties (e.g., a VID or EID) that will be read/write all together. The property bundle 701 organizes properties into different bundles that can be fused together, reducing disk I/O. Property bundles organize the properties into different bundles for reducing disk bandwidth. That is, a property bundle enables dynamic all/delete properties to be used, where any property bundle column store for a graph can be addressed.

Stated another way, FIG. 7 illustrates an exemplary optimized method of the mechanism described in FIG. 5. In the example show in FIG. 5, each property is stored in its own table. In the example shown in FIG. 7, a number of properties are grouped into a property bundle. The property bundle is read and written as a block. Advantageously, for the properties are grouped into a property bundle, individual reads from multiple tables/files can be avoided. In the read operation, the bundle is read with its multiple properties from one table/file. This exploits the disk bandwidth better than an individual-property-per-table approach.

According to an embodiment of the present invention, a computer system 800 includes a multi-version graph engine 801, memory device 402 (e.g., random access memory (RAM), etc.) and persistent storage 403 (e.g., hard disk, main memory). The stream graph engine 401 executes an algorithm for representing multi-versioning graphs in memory and on disk using streaming graphs. The algorithm includes storing a set of contiguous graphs where each slice gives a graph structure and properties at a particular timestamp. The multi-version graph engine 801 accepts graph updates and returns graph queries 404. A versioning control module 802 provides version numbers (e.g., timestamps) and controls the number of versions 803 to maintain (e.g., sliding window size). The in-memory graph is cached from the on-disk persistent storage graph.

Recapitulation

According to an embodiment of the present invention, a data storage and retrieval system for a computer memory includes a stream graph engine extracting graph data from streaming data, the graph data occupying a sliding window and comprising a plurality of slices representing a set of contiguous graphs, and where each slice of the plurality of slices corresponds to a given graph structure and its properties at a particular time, the stream graph engine causing the computer memory to store an on-disk portion of the graph data including a key table, a timestamp table and a plurality of property files, wherein the key table comprises a plurality of pointers to corresponding entries of the timestamp table, wherein each of the entries of the timestamp table comprise a corresponding timestamp and a pointer to the properties files, wherein the properties files comprise properties of a corresponding graph of the set of contiguous graphs and an in-memory portion of the graph data having a cache data structure storing a subset of the key table, and a versioning control module storing evolving changes in the graph data in the computer memory.

The methodologies of embodiments of the disclosure may be particularly well-suited for use in an electronic device or alternative system. Accordingly, embodiments of the present invention may take the form of an entirely hardware embodiment or an embodiment combining software and hardware aspects that may all generally be referred to herein as a "processor," "circuit," "module" or "system."

Furthermore, it should be noted that any of the methods described herein can include an additional step of providing a computer system for storing streaming graphs in memory and/or on disk. Further, a computer program product can include a tangible computer-readable recordable storage medium with code adapted to be executed to carry out one or more method steps described herein, including the provision of the system with the distinct software modules.

Figure 8:
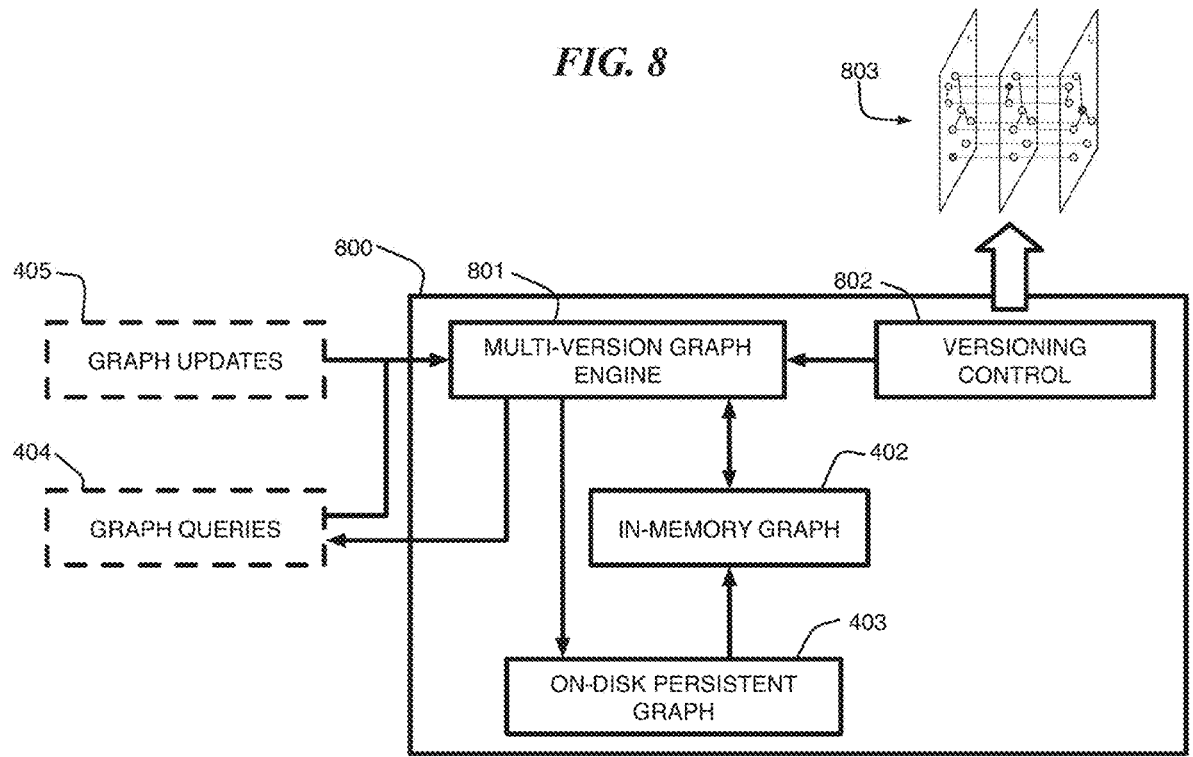
FIG. 8 is a system configured to store multi-version graphs, according to an embodiment of the present invention.
Figure 9:
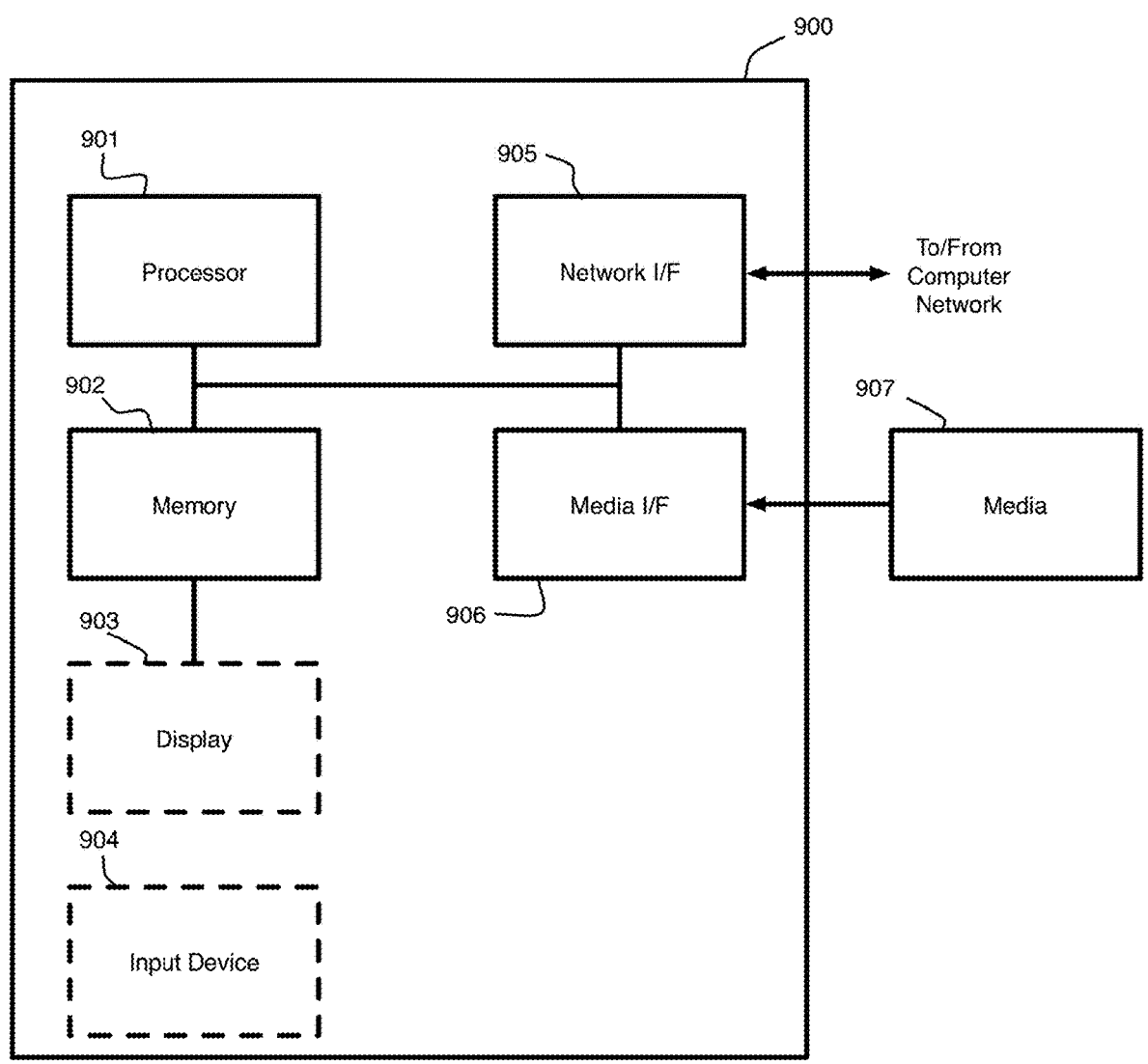
FIG. 9 is a block diagram depicting an exemplary computer system embodying a method for analyzing an image using a policy function according to an exemplary embodiment of the present invention.

Referring to FIG. 9; FIG. 9 is a block diagram depicting an exemplary computer system embodying the computer system for storing streaming graphs in memory and/or on disk (see FIG. 4 and FIG. 8) according to an embodiment of the present invention. The computer system shown in FIG. 9 includes a processor 901, memory 902, display 903, input device 904 (e.g., keyboard), a network interface (I/F) 905, a media I/F 906, and media 907, such as a signal source, e.g., camera, Hard Drive (HD), external memory device, etc.

In different applications, some of the components shown in FIG. 5 can be omitted. The whole system shown in FIG. 9 is controlled by computer readable instructions, which are generally stored in the media 907. The software can be downloaded from a network (not shown in the figures), stored in the media 907. Alternatively, software downloaded from a network can be loaded into the memory 902 and executed by the processor 901 so as to complete the function determined by the software.

The processor 901 may be configured to perform one or more methodologies described in the present disclosure, illustrative embodiments of which are shown in the above figures and described herein. Embodiments of the present invention can be implemented as a routine that is stored in memory 902 and executed by the processor 901 to process the signal from the media 907. As such, the computer system is a general-purpose computer system that becomes a specific purpose computer system when executing routines of the present disclosure.

Although the computer system described in FIG. 9 can support methods according to the present disclosure, this system is only one example of a computer system. Those skilled of the art should understand that other computer system designs can be used to implement embodiments of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A data storage and retrieval system for a computer memory, comprising:
   a stream graph engine extracting graph data from streaming data, said graph data occupying a sliding window and comprising a plurality of slices representing a set of contiguous graphs, and where each slice of said plurality of slices corresponds to a respective one of said contiguous graphs and its properties at a particular time, said stream graph engine causing said computer memory to store:
   an on-disk portion of said graph data including a key table, a timestamp table and a plurality of property files, wherein said key table comprises a plurality of pointers to corresponding entries of said timestamp table, wherein each of said entries of said timestamp table comprise a corresponding timestamp and a pointer to said properties files, wherein said properties files store said properties of a corresponding one of said contiguous graphs; and
   an in-memory portion of said graph data having a cache data structure storing a subset of said key table comprising a subset of said plurality of pointers to corresponding entries of said timestamp table,
   wherein said storing comprises writing each slice synchronously to said on-disk portion and said in-memory portion; and
   a versioning control module storing evolving changes in said graph data between said slices and controlling a size of said sliding window,
   wherein said contiguous graphs comprise a plurality of edges and a plurality of vertices, and properties of each edge and each vertex are stored across a plurality of property bundles as said evolving changes organized by timestamp, wherein all of said properties of a given edge or vertex at a given timestamp are addressed by a respective individual entry corresponding to one of the bundles in a timestamp table.

2. The data storage and retrieval system of claim 1, wherein said properties of said corresponding one of said contiguous graphs are addressed as a bundle.

3. The data storage and retrieval system of claim 1, wherein said versioning control module uses temporal versioning.

4. The data storage and retrieval system of claim 1, wherein said versioning control module generates said corresponding timestamps.

5. The data storage and retrieval system of claim 1, wherein said corresponding timestamps relate to respective versions of said graph data, and wherein said versioning control module controls a number of said versions of said graph data stored by maintaining said size of said sliding window.

6. A method for operating a data storage and retrieval system for a computer memory, said method comprising:
    extracting, by a stream graph engine, graph data from streaming data, said graph data occupying a sliding window and comprising a plurality of slices representing a set of contiguous graphs, and where each slice of said plurality of slices corresponds to a respective one of said contiguous graphs and its properties at a particular time;
    storing, by said stream graph engine, an on-disk portion of said graph data including a key table, a timestamp table and a plurality of property files, wherein said key table comprises a plurality of pointers to corresponding entries of said timestamp table, wherein each of said entries of said timestamp table comprise a corresponding timestamp and a pointer to said properties files, wherein said properties files store said properties of a corresponding one of said contiguous graphs;
    storing, by said stream graph engine, an in-memory portion of said graph data having a cache data structure storing a subset of said key table comprising a subset of said plurality of pointers to corresponding entries of said timestamp table,
    wherein for each slice, said storing of said on-disk portion and said storing of said in-memory portion are performed synchronously; and
    storing in said computer memory, by a versioning control module, newly extracted graph data from the streaming data in said graph data as evolving changes in said graph data between said slices and controlling a size of said sliding window,
    wherein said contiguous graphs comprise a plurality of edges and a plurality of vertices, and properties of each edge and each vertex are stored across a plurality of property bundles as said evolving changes organized by timestamp, wherein all of said properties of a given edge or vertex at a given timestamp are addressed by a respective individual entry corresponding to one of the bundles in a timestamp table.

7. The method of claim 6, further comprising addressing at least one of said property bundles.

8. The method of claim 6, further comprising performing, by said versioning control module uses, temporal versioning for said storing of said evolving changes in said graph data.

9. The method of claim 6, further comprising generating, by said versioning control module, said corresponding timestamps.

10. The method of claim 6, wherein said corresponding timestamps relate to respective versions of said graph data, and wherein said versioning control module controls a number of said versions of said graph data stored by maintaining a size of said sliding window.

11. A non-transitory computer readable medium comprising computer executable instructions which when executed by a computer cause the computer to perform a method for operating a data storage and retrieval system for a computer memory, said method comprising:
    extracting, by a stream graph engine, graph data from streaming data, said graph data occupying a sliding window and comprising a plurality of slices representing a set of contiguous graphs, and where each slice of said plurality of slices corresponds to a respective one of said contiguous graphs and its properties at a particular time;
    storing, by said stream graph engine, an on-disk portion of said graph data including a key table, a timestamp table and a plurality of property files, wherein said key table comprises a plurality of pointers to corresponding entries of said timestamp table, wherein each of said entries of said timestamp table comprise a corresponding timestamp and a pointer to said properties files, wherein said properties files store said properties of a corresponding one of said contiguous graphs;
    storing, by said stream graph engine, an in-memory portion of said graph data having a cache data structure storing a subset of said key table comprising a subset of said plurality of pointers to corresponding entries of said timestamp table,
    wherein for each slice, said storing of said on-disk portion and said storing of said in-memory portion are performed synchronously; and
    storing in said computer memory, by a versioning control module, newly extracted graph data from the streaming data in said graph data as evolving changes in said graph data between said slices and controlling a size of said sliding window,
    wherein said contiguous graphs comprise a plurality of edges and a plurality of vertices, and properties of each edge and each vertex are stored across a plurality of property bundles as said evolving changes organized by timestamp, wherein all of said properties of a given edge or vertex at a given timestamp are addressed by a respective individual entry corresponding to one of the bundles in a timestamp table.

12. The computer readable medium of claim 11, further comprising addressing, by said stream graph engine, at least one of said property bundles.

13. The computer readable medium of claim 11, further comprising performing, by said versioning control module uses, temporal versioning for said storing of said evolving changes in said graph data.

14. The computer readable medium of claim 11, further comprising generating, by said versioning control module, said corresponding timestamps.

15. The computer readable medium of claim 11, wherein said corresponding timestamps relate to respective versions of said graph data, and wherein said versioning control module controls a number of said versions of said graph data stored by maintaining a size of said sliding window.

* * * * *